United States Patent
Prinz et al.

(10) Patent No.: US 11,777,903 B2
(45) Date of Patent: Oct. 3, 2023

(54) METHOD FOR TRANSMITTING DATA BETWEEN A VEHICLE AND A VEHICLE SECURITY SYSTEM, A TRANSMISSION AND RECEPTION DEVICE, AND DATA TRANSMISSION SYSTEM

(71) Applicant: FREQUENTIS AG, Vienna (AT)

(72) Inventors: Richard Prinz, Vienna (AT); Saadan Ansari, Vienna (AT)

(73) Assignee: Frequentis AG, Vienna (AT)

( * ) Notice: Subject to any disclaimer, the term of this patent is extended or adjusted under 35 U.S.C. 154(b) by 0 days.

(21) Appl. No.: 16/934,352

(22) Filed: Jul. 21, 2020

(65) Prior Publication Data

US 2021/0029085 A1    Jan. 28, 2021

(30) Foreign Application Priority Data

Jul. 24, 2019    (AT) ............................... A50667/2019

(51) Int. Cl.
*H04L 9/40*       (2022.01)
*H04L 43/028*    (2022.01)
*H04L 47/2441*   (2022.01)

(52) U.S. Cl.
CPC ........ *H04L 63/0263* (2013.01); *H04L 43/028* (2013.01); *H04L 47/2441* (2013.01); *H04L 63/20* (2013.01)

(58) Field of Classification Search
CPC ............. H04L 41/0806; H04L 41/0823; H04L 41/0843; H04L 41/0886; H04L 41/0893;
(Continued)

(56) References Cited

U.S. PATENT DOCUMENTS 8,971,236 B2    3/2015    Dunas et al.
10,187,134 B1   1/2019    Bialer et al.
(Continued)

FOREIGN PATENT DOCUMENTS

DE    10338487 B3    5/2005
EP     1618748 A2    1/2006
(Continued)

*Primary Examiner* — Zhensheng Zhang
(74) *Attorney, Agent, or Firm* — Laurence A. Greenberg; Werner H. Stemer; Ralph E. Locher

(57) ABSTRACT

A method transmits data between a vehicle and a traffic security system. A number of transmission channels are available for transmitting data between the vehicle and the traffic security system. Data packets are specified for the transmission to the traffic security system. The transmission quality of the individual transmission channels is measured. A transmission configuration is selected from a plurality of transmission configurations, from the type of data and the ascertained transmission qualities, and other specifications according to a specified set of rules. The transmission configuration specifies particular transmission channels for individual data packets which are associated with a service, possibly as a function of the content of the data packet. An identifier characterizing the transmission configuration is added to the data packets. The data packets specified in the vehicle for the transmission are transmitted, together with the identifier, to the traffic security system according to the transmission configuration.

11 Claims, 3 Drawing Sheets

(58) Field of Classification Search
CPC ............... H04L 43/028; H04L 43/0805; H04L 47/2441; H04L 63/0263; H04L 63/20; H04W 72/0453; H04W 72/085; H04W 76/11; H04W 76/15
See application file for complete search history.

(56) References Cited

U.S. PATENT DOCUMENTS

| | | | |
|---|---|---|---|
| 10,607,495 B2 | 3/2020 | Lohmiller et al. | |
| 2002/0054576 A1* | 5/2002 | Gobbi | H04L 12/5601 370/316 |
| 2012/0051221 A1* | 3/2012 | Bui | H04L 45/42 370/235 |
| 2014/0010196 A1* | 1/2014 | Shapira | H04B 7/2681 370/329 |
| 2015/0156789 A1* | 6/2015 | Beacham, Jr. | H04W 84/06 455/431 |

FOREIGN PATENT DOCUMENTS

| | | | | |
|---|---|---|---|---|
| EP | 1618748 B1 * | 4/2016 | ............. | H04B 17/24 |
| EP | 3267424 A1 | 1/2018 | | |
| JP | 6176247 B2 * | 8/2017 | ........... | H04L 67/145 |
| WO | 03085860 A1 | 10/2003 | | |
| WO | 2004095851 A2 | 11/2004 | | |
| WO | 2005018261 A2 | 2/2005 | | |

* cited by examiner $UC_1$

| ID: HH, Index: 1 | |
|---|---|
| Traffic match | Action |
| ATS | Via VHF |
| AOC | VIA SAT |
| | |

Fig. 2A $UC_4$

| ID: HU, Index: 4 | |
|---|---|
| Traffic match | Action |
| * | Via VHF |
| | |

Fig. 2B $UC_{13}$

| ID: UH, Index: 13 | |
|---|---|
| Traffic match | Action |
| * | Via SAT |
| | |

Fig. 2C $UC_9$

| ID: LH, Index: 9 | |
|---|---|
| Traffic match | Action |
| ACARS | Via VHF |
| CPDLC | VIA SAT |
| * | Via VHF |

Fig. 2D

METHOD FOR TRANSMITTING DATA BETWEEN A VEHICLE AND A VEHICLE SECURITY SYSTEM, A TRANSMISSION AND RECEPTION DEVICE, AND DATA TRANSMISSION SYSTEM

CROSS-REFERENCE TO RELATED APPLICATION

This application claims the priority, under 35 U.S.C. § 119, of Austria application A 50667/2019, filed Jul. 24, 2019; the prior application is herewith incorporated by reference in its entirety.

BACKGROUND OF THE INVENTION

Field of the Invention

The present invention relates to a method for transmitting data between a vehicle and a vehicle security system, a transmission and reception device, and a data transmission system.

The prior art discloses carrying out data communication between a vehicle, for example, an aircraft, and a traffic security system, for example, a ground-based flight security system, for example, for the purpose of communication, navigation, or monitoring via routers. Routing tables are stored on such a router, containing information about how data packets are to be routed, for example, via various networks, based on their IP address. However, the paths for routing the data packets are usually fixedly specified in such routing tables, and cannot be adjusted, for example, according to availability or transmission quality of individual transmission channels.

In standard networks, for example, the Internet, routing protocols such as BGP4, RIP, or OSPF are available which can change the routing tables of a router according to the availability of communication connections. However, in the case of data communication between a vehicle and a traffic security system, such routing protocols cannot be used, since, on the one hand, they respond slowly to changes, thus being unsuitable for data communication in the field of, for example, flight security, and on the other hand, large data quantities must be transmitted for exchanging routing information between routers, thus also being unsuitable, for example, for aircraft having communication channels with limited bandwidth.

BRIEF SUMMARY OF THE INVENTION

The object of the present invention is therefore to find a remedy in this regard, and to provide a method for transmitting data between a vehicle and a traffic security system which enables a rapid adjustment of the transmission paths depending, for example, on availability or transmission quality of individual transmission channels, without having to transmit large data quantities for exchanging routing information.

The present invention achieves this object with a method for transmitting data between a vehicle, for example, an aircraft or watercraft, and a traffic security system, for example, a ground-based flight security system or a shipping security system. According to the present invention, it is provided that:

a) a number of possible transmission channels are available for transmitting data between a vehicle and the traffic security system;

b) data packets are specified in the vehicle for the transmission to the traffic security system;

c) the transmission quality of the individual transmission channels is measured, in particular continuously and/or at a plurality of instants;

d) a transmission configuration is selected from a plurality of previously specified transmission configurations, from the type of data to be transmitted and the ascertained transmission qualities, and possibly other specifications according to a specified set of rules;

e) the transmission configuration specifies particular transmission channels for individual data packets which are associated with a service, possibly as a function of the content of the respective data packet;

f) an identifier characterizing the transmission configuration is added to the data packets; and g) the data packets specified in the vehicle for the transmission are transmitted, together with the identifier, to the traffic security system corresponding to the transmission configuration.

As a result of this embodiment of a method according to the present invention, it is advantageously ensured that, on the one hand, the transmission channels which are currently available, the transmission quality of the transmission channels, the type of data to be transmitted, as well as possibly other, for example, user-specific, specifications for the data transmission, can be taken into consideration, by means of the selection of a corresponding transmission configuration. The data packets to be transmitted can thus be transmitted from the vehicle to the traffic security system in any traffic situation via the optimal transmission channel.

This means that, should a transmission channel no longer be available or has poor transmission quality during the transmission, another transmission configuration is simply selected, and the data transmission can be continued via this transmission channel, wherein the address of the communication partners remains unchanged. Principles from software-defined networking are applied for routing the data packets between the vehicle and the traffic security system. As a result of the identifier which characterizes the transmission configuration being transmitted from the vehicle to the traffic security system, information is available in the traffic security system which indicates which transmission configuration was used for transmitting the data packets from the vehicle.

Particularly reliable data transmission between the traffic security system and the vehicle can be ensured if:

a) data packets are specified for the subsequent data transmission between the traffic security system and the vehicle;

b) for each of the transmission configurations in the vehicle, a respective additional transmission configuration is available, in particular on the ground, which enables a return transmission over the same transmission channel;

c) the identifier is identified from the data packet transmitted by the vehicle, and the additional transmission configuration is selected which is associated with the identifier; and d) the specified data packets are transmitted from the traffic security system to the vehicle corresponding to the selected additional configuration.

A transmission of the identifier which characterizes the transmission configuration used by the vehicle may, on the one hand, be effectuated in that the characterizing identifier is transmitted to the traffic security system as a separate data packet.

A particularly advantageous transmission of the identifier may take place in that the identifier is transmitted "piggyback" in the existing data traffic from the vehicle to the traffic security system, for example, in the flow label field of an IPv6 data packet. In this way, the required bandwidth and the size of the data packets to be transmitted can be reduced.

In order to inform the traffic security system about the state of the vehicle or about the current transmission configuration to be used, it may be provided that dummy data packets containing the characterizing identifier are transmitted from the vehicle to the traffic security system, for updating the additional transmission configuration to be used by the traffic security system for data transmission to the vehicle, in particular if no data packet has been transmitted from the vehicle to the traffic security system for a longer period of time.

The object of the present invention is furthermore to provide a transmission and reception device which enables a vehicle, in particular an aircraft or watercraft, to make a data transmission according to the present invention.

According to the present invention, it is provided that the transmission and reception device contain:
  a) a number of transmission units for transmitting data over transmission channels between the vehicle and a traffic security system, in particular a ground-based flight security system or shipping security system;
  b) at least one data processing system for creating data packets for transmission to the traffic security system, and for processing data packets transmitted to the vehicle;
  c) an onboard multilink unit which is coupled to the transmission channels and which is connected to the at least one data processing system, and which is configured to route data packets to be transmitted to the transmission channels, and/or to obtain received data packets from the transmission channels; and
  d) a multilink management unit which contains a memory and which is connected to the onboard multilink unit and which is possibly coupled to the transmission channels, wherein a specified set of rules is stored in the memory of the multilink management unit, containing a plurality of transmission configurations for routing data packets to be transmitted, wherein the multilink management unit is configured:
    d1) to measure the transmission quality which is available for the data transmission in the individual transmission channels, in particular continuously and/at a plurality of instants;
    d2) to select a transmission configuration from the type of data to be transmitted and the ascertained transmission qualities, as well as possibly additional specifications according to the predetermined set of rules; and
    d3) to specify particular transmission channels and to add an identifier to the data packets characterizing the transmission configuration, corresponding to the respectively selected transmission configuration for individual data packets associated with a service, possibly as a function of the content of the respective data packet; and
    d4) to actuate the onboard multilink unit for transmitting the data packets to the flight security system, together with the identifier, over the transmission channels specified corresponding to the transmission configuration.

In order to transmit the identifier which characterizes the transmission configuration used by the vehicle to the traffic security system in a reliable manner, on the one hand, it may be provided that the multilink management unit is configured to specify the characterizing identifier as a separate data packet for transmission to the traffic security system.

A particularly advantageous transmission of the identifier may take place if the multilink management unit is configured to add the characterizing identifier to the specified data packets (ATS, AOC) in the vehicle for the transmission to the traffic security system as a component, in particular piggyback. Thus, the identifier may, for example, be transmitted in the flow label field of an IPv6 data packet. In this manner, the required bandwidth and the size of the data packets to be transmitted may be advantageously reduced.

In order always to provide the vehicle with a current transmission configuration to be used for a data transmission, it may be provided that the multilink management unit is configured to create the dummy data packet containing the characterizing identifier and to actuate the onboard multilink unit, in order to transmit these dummy data packets, for updating an additional transmission configuration to be used for data transmission to the vehicle, in particular if no more data packets have been transmitted from the vehicle for a longer period of time.

One object of the present invention is furthermore to provide a data transmission system which enables data transmission according to the present invention between a vehicle, in particular an aircraft or watercraft, and a traffic security system, in particular a flight security system or shipping security system.

According to the present invention, it is provided that the data transmission system contains a transmission and reception device according to the present invention for use in a vehicle, and a stationary transmission and reception device according to the present invention for use in a traffic security system.

According to the present invention, it is provided that the stationary transmission and reception device contains:
  a) a number of transmission units for transmitting data in the transmission channels between the traffic security system and a vehicle, in particular an aircraft or watercraft;
  b) at least one data processing system for creating additional data packets for transmission to the vehicle, in particular, an aircraft or watercraft, and for processing data packets transmitted to the traffic security system;
  c) a ground multilink unit which is coupled to the transmission channels and which is connected to the at last one data processing system, and which is configured to route additional data packets to be transmitted over the transmission channels, and/or to obtain received data packets over the transmission channels; and
  d) a stationary multilink management unit which is connected to the ground multilink unit, containing an additional memory;
  e) wherein an additional specified set of rules containing a plurality of additional transmission configurations for routing additional data packets to be transmitted is stored in the additional memory, wherein a respective additional transmission configuration is available in the additional memory for each of the transmission configurations of the transmission and reception device, the additional transmission configuration enabling a return transmission over the same channel; and
  f) wherein the stationary multilink management unit is configured:

f1) to identify the identifier from a data packet transmitted to the traffic security system, and to select the additional transmission configuration which is associated with the identifier;

f2) to specify particular transmission channels corresponding to the respectively selected additional transmission configuration; and f3) to actuate the ground multilink unit for transmitting the additional data packets to the vehicle over the specified transmission channels corresponding to the additional transmission configuration.

Additional advantages and embodiments of the present invention result from the description and the attached drawings.

Exemplary embodiments of the present invention which are particularly advantageous but which are not to be understood as being restrictive will be schematically depicted below with the aid of the attached drawings, and will be described by way of example, making reference to the drawings.

Other features which are considered as characteristic for the invention are set forth in the appended claims.

Although the invention is illustrated and described herein as embodied in a method for transmitting data between a vehicle and a vehicle security system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 2A to 2D are illustrations depicting exemplary embodiments of transmission configurations.

DETAILED DESCRIPTION OF THE INVENTION

Referring now to the figures of the drawings in detail and first, particularly to FIG. 1 thereof, there is shown a method according to the present invention for transmitting data between a vehicle and a traffic security system, a transmission and reception device 100 according to the present invention, and a stationary transmission and reception device 200 according to the present invention will be described below by way of example, based on an exemplary embodiment for data transmission in aviation.

Figure 1:
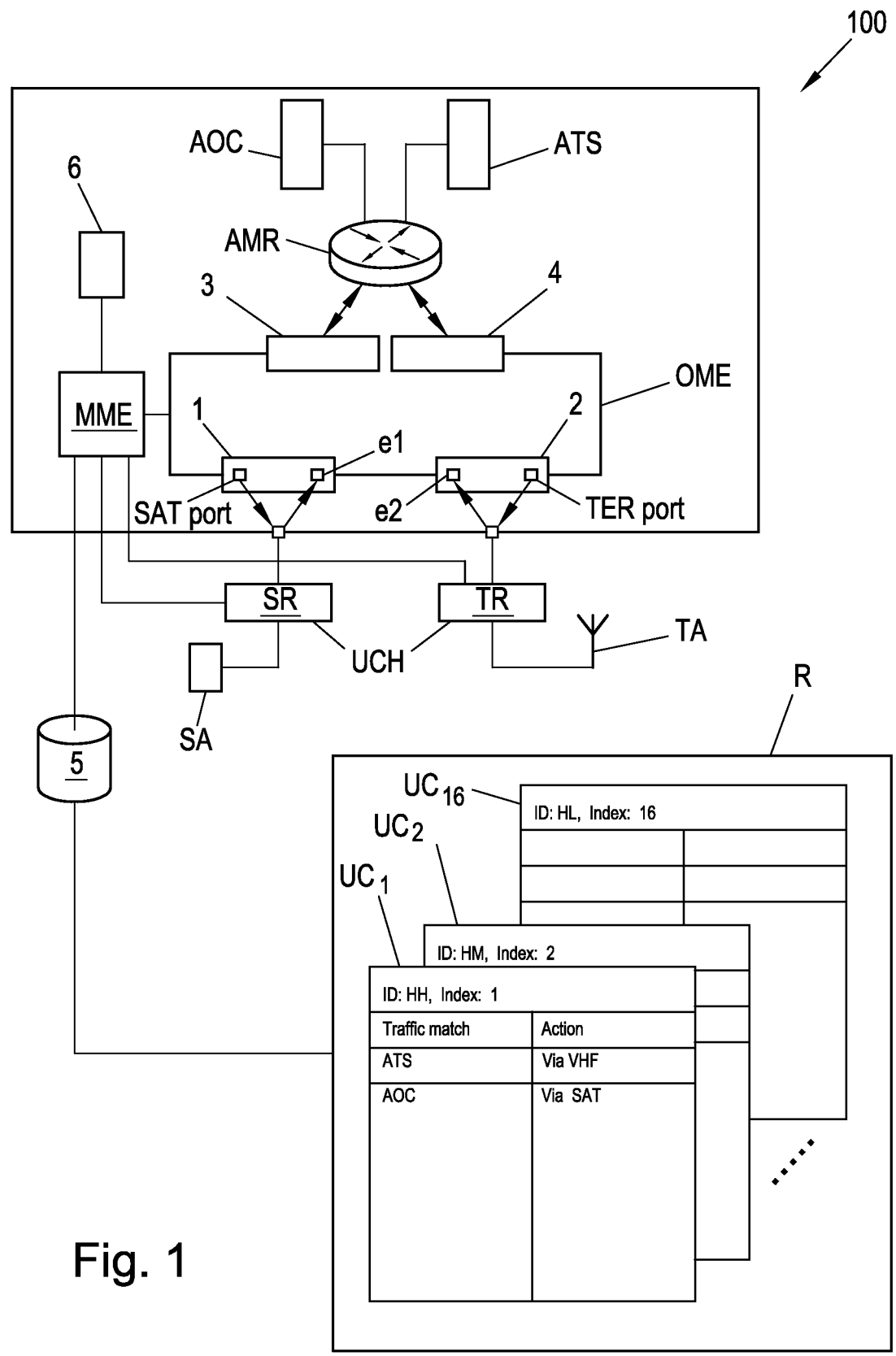
FIG. 1 is an illustration depicting an aircraft containing an onboard multilink unit for carrying out a method according to the present invention for transmitting data.

FIG. 1 depicts a schematic representation of an aircraft which is equipped with a vehicle-side transmission and reception device 100 for carrying out a method according to the present invention for data transmission, containing an onboard multilink unit OME and a multilink management unit MME. The aircraft furthermore contains transmission units for transmitting data over two transmission channels UCH, in the depicted exemplary embodiment, containing a satellite radio channel SR and a terrestrial radio channel TR. The option of transmitting data over the satellite radio channel SR is schematically depicted in FIG. 1 by a satellite radio antenna SA, and by a terrestrial radio antenna TA for the terrestrial radio channel TR.

In the depicted exemplary embodiment in FIG. 1, the onboard multilink unit OME contains a first interface 1 for satellite data communication and a second interface 2 for terrestrial data communication. The first interface 1 for satellite data communication contains a satellite communication input $e_1$ and a satellite communication output $SAT_{port}$. The second interface 2 for terrestrial data communication comprises a terrestrial communication input $e_2$ and a terrestrial communication output $TER_{port}$. The direction in which the data packets to be transmitted are transmitted is indicated in FIG. 1 by arrows.

In FIG. 1, the onboard multilink unit OME furthermore contains a third interface 3 for routing data packets, which were received over the satellite channel SR, to a mobile aircraft router AMR of the aircraft. In FIG. 1, the onboard multilink unit OME furthermore contains a fourth interface 4 via which data packets which are received over the terrestrial radio channel TR are routed to the mobile aircraft router AMR. Data packets which, for example, relate to remote flight signaling ATS or operative signaling AOC are created on board the aircraft, for example, by two different data processing systems, and transmitted via the mobile aircraft router AMR of the aircraft to the third interface 3 and the fourth interface 4. Such data packets may be routed respectively via the third interface 3 and the fourth interface 4 to the first interface 1 for satellite data communication or the second interface 2 for terrestrial data communication.

In the exemplary embodiment in FIG. 1, the onboard multilink unit OME is connected to the multilink management unit MME, which is connected to the satellite radio channel SR and the terrestrial radio channel TR, a memory 5, and the instrument panel 6 in the cockpit of the aircraft. As a result of the multilink management unit MME being connected to the instrument panel 6, it is, for example, possible for the pilot of the aircraft to make inputs and to transmit them to the multilink management unit MME.

A set of rules R containing a plurality of previously specified transmission configurations UC is stored in the memory 5 of the onboard multilink unit OME. The individual transmission configurations UC specify particular transmission channels UCH for individual data packets which are associated with a service for transmitting data. The individual transmission configurations UC are characterized by a characterizing identifier, for example, an index. This characterizing identifier is indicated in FIG. 1 as index numbers 1 to 16.

The multilink management unit MME is furthermore connected to the interfaces 1, . . . , 4. The transmission quality of the individual transmission channels UCH of the aircraft is continuously measured and transmitted to the multilink management unit MME. In addition, as in FIG. 1 and FIG. 3, the multilink management unit MME may be directly coupled to the transmission channels UCH. Alternatively, the connection to the transmission channels UCH may also be established via the onboard multilink unit OME.

Figure 3:
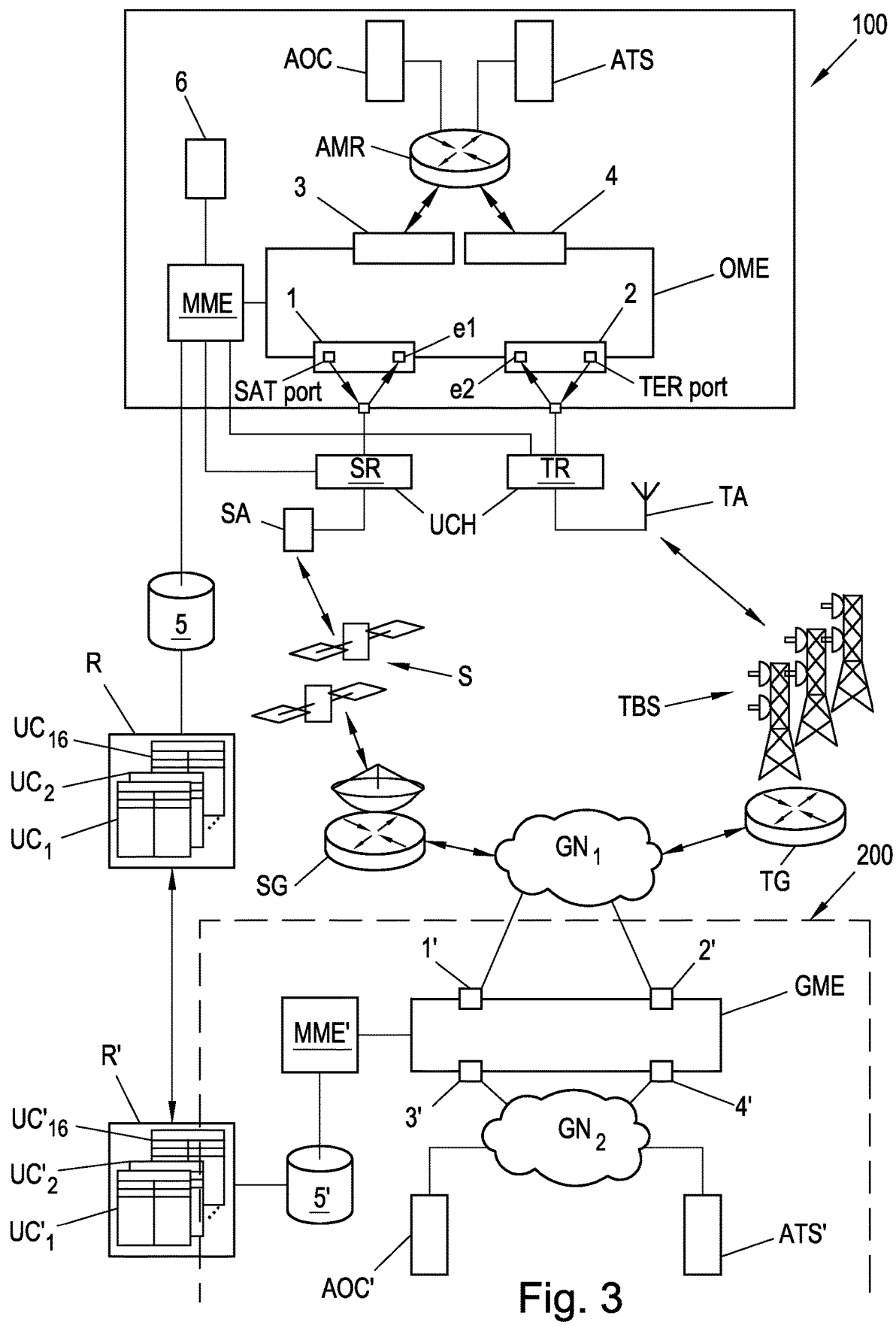
FIG. 3 is an illustration depicting an exemplary embodiment of a transmission of data according to the present invention between the aircraft from FIG. 1 and a ground-based flight security system.

In the exemplary embodiment in FIG. 1, the transmission quality of each transmission channel UCH may assume four states: good transmission quality H, medium transmission quality M, poor transmission quality L, and no transmission possible U. Thus, a total of 16 possible constellations HH, HU, UH, LH, . . . , result from the four possible transmission qualities H, M, L, U of the terrestrial radio channel TR and the four possible transmission qualities H, M, L, U of the satellite radio channel SR, for which one transmission configuration UC is stored in each case. In FIGS. 1 to 3, the first letter here respectively indicates the transmission quality of the terrestrial radio channel TR, and the second letter indicates the transmission quality of the satellite radio channel SR.

As already mentioned, each transmission configuration UC contains rules for how data packets which are associated with a service are to be routed. These rules may be determined, for example, based on the source and/or target addresses of the data packets, the TCB and/or UTB port numbers, or other criteria, for example, as a function of the content of the respective data packet.

FIGS. 2A to 2D depict examples of such transmission configurations UC. FIG. 2A depicts a first transmission configuration $UC_1$ for a constellation HH, i.e., good transmission quality H of both the satellite and the terrestrial radio channel, having the characterizing identifier or index number "1". The first transmission configuration $UC_1$ arranges for data packets ATS which, for example, relate to remote flight signaling, are to be transmitted over the terrestrial radio channel TR via very high frequency VHF. Data packets AOC which relate to the operative control of the aircraft are transmitted over the satellite radio channel SR, which is characterized by the reference "SAT".

FIG. 2B depicts another exemplary embodiment of a transmission configuration $UC_4$ having the characterizing identifier "4". In FIG. 2B, it is apparent that this transmission configuration $UC_4$ is used for a constellation HU if the terrestrial radio channel TR has good transmission quality H and no transmission U is possible over the satellite radio channel SR. In this case, all data packets to be transmitted are transmitted via very high frequency, i.e., the terrestrial radio channel TR via very high frequency VHF.

FIG. 2C depicts a further exemplary embodiment of a transmission configuration $UC_{13}$ having the characterizing identifier "13". The transmission configuration $UC_{13}$ is used for a constellation UH if no data transmission U is possible over the terrestrial radio channel TR, but the satellite radio channel SR has good transmission quality H. In this case, all data packets to be transmitted are transmitted over the satellite radio channel SR, which is identified by the indicator "SAT".

FIG. 2D depicts another exemplary embodiment of a transmission configuration $UC_9$ having the characterizing indicator "9", which is used for a constellation LH, i.e., if the transmission quality of the terrestrial radio channel TR is L, i.e., poor, and the transmission quality of the satellite radio channel SR is H, i.e., good. In this case, messages, for example, short data telegrams having a data rate of 2.4 kbps, which would normally be transmitted by means of ACARS, are transmitted via very high frequency, i.e., the terrestrial radio channel TR via very high frequency VHF. ACARS is the Aircraft Communications Addressing and Reporting System, a digital data radio system for transmitting messages between aircraft 100 and a flight security system 200, as described at https://de.wikipedia.org/wiki/ACARS, last requested on 1 Jul. 2019.

CPDLC, i.e., Controller Pilot Data Link Communications up to max 20 kbps, i.e., voice communication between an air traffic controller and a pilot, described at, for example, https://en.wikipedia.org/wiki/Controller%E2%80%93pilot_data_link_communications, last requested on 1 Jul. 2019, are in this case, as is apparent in FIG. 2, transmitted over the satellite radio channel SR, which is characterized by the reference "SAT". All other data transmissions are carried out when using the transmission configuration $UC_9$ via very high frequency, i.e., the terrestrial radio channel TR via very high frequency VHF.

The selection of the transmission configuration UC to be used is triggered by the multilink management unit MME with every change in state of the transmission quality of a transmission channel UCH of the aircraft, or is possibly, for example, manually triggered by a pilot of the aircraft via an input at the instrument panel 6.

However, as already previously mentioned, not only does the transmission quality flow into the decision as to which transmission configuration UC is used for data packets to be transmitted to a traffic security system, but also the content of the data packets, i.e., whether said data packets, for example, are data packets ATC which, in the exemplary embodiment, relate to the operation of the aircraft 100, or are data packets ATS which relate to remote flight signaling, or, for example, are subject to special confidentiality. Furthermore, preferences of the airline may be input by pilots via the instrument panel 6 and may be incorporated into the selection of the transmission configuration UC.

Subsequently, the multilink management unit MME configures the onboard multilink unit OME corresponding to the selected transmission configuration UC, meaning that a transmission of the data packets associated with a corresponding service to a flight security system takes place via the first interface 1 for satellite data communication and the satellite radio channel SR, or the second interface 2 and the terrestrial radio channel TR, depending on transmission configuration UC.

With the aid of FIG. 3, a method according to the present invention for transmitting data between an aircraft equipped with a vehicle-side transmission and reception device 100, and a ground-based flight security system which comprises a stationary transmission and reception device 200, will now be described by way of example. The embodiment of the onboard multilink unit OME and the multilink management unit MME of the aircraft are depicted in detail in FIG. 1, and have already been previously described in detail in connection with FIG. 1. Examples of the transmission configurations stored in the memory 5 are depicted in FIGS. 2A to 2D, as already mentioned.

FIG. 3 additionally depicts an exemplary embodiment of a ground-based flight security system which comprises a stationary transmission and reception device 200. In FIG. 3, the stationary transmission and reception device 200 comprises a ground multilink unit GME, of which the inputs and outputs are connected to a first network $GN_1$ and a second network $GN_2$. The stationary transmission and reception device 200 furthermore comprises a ground-based stationary multilink management unit MME' which is connected to another memory 5' in which another specified set of rules R' is stored, containing a plurality of additional transmission configurations UC' for transmitting data between the flight security system and an aircraft.

The first network $GN_1$, which is connected to, or exchanges data with, data inputs and outputs 1', 2' of the ground multilink unit GME, is also in data communication with a satellite gateway SG and a terrestrial gateway TG, so that data packets created by the flight security system can be transmitted via the first network $GN_1$ to the satellite gateway SG or the terrestrial gateway TG for transmission to the aircraft.

From the satellite gateway SG, the data packets to be transmitted are transmitted to satellites S, from where the data packets are transmitted to the satellite antenna SA of the aircraft. The terrestrial gateway TG transmits data packets to be transmitted to one or several terrestrial base stations TBS, which route the data packets to be transmitted to the terrestrial antenna TA of the aircraft.

Data packets to be transmitted ATS which relate to remote flight signaling, or data packets AOC which relate to the operation of the aircraft, which, for example, are created by data processing systems of the stationary transmission and reception device 200 of the flight security system, are transmitted via the second network $GN_2$ to corresponding internal data inputs and outputs 3', 4' of the flight security system for later routing to the aircraft.

In FIG. 3, data packets are to be transmitted between the aircraft and the ground-based flight security system. As already previously described, two transmission channels UCH are available to the aircraft, in particular a satellite radio channel SR and a terrestrial radio channel TR. The transmission quality of the individual transmission channels UCH is continuously measured and provided to the multilink management unit MME of the aircraft.

In the exemplary embodiment in FIG. 3, data packets ATS which relate to remote flight signaling are to be transmitted to the flight security system. In addition, data packets to this effect are specified by the aircraft for transmission to the flight security system. In the exemplary embodiment, the aircraft first becomes airborne and, when measuring the transmission quality of the transmission channels UCH, it is ascertained that the terrestrial radio channel TR is providing good transmission quality H, whereas the satellite radio channel SR is not available U.

In this case, the multilink management unit MME chooses the transmission configuration $UC_4$ depicted in FIG. 2B having the characterizing identifier "4", based on the ascertained transmission qualities from the transmission configurations UC available in the set of rules R. The type of data to be transmitted or other specifications may be taken into consideration as appropriate. In the specific example, this means that all data packets are transmitted over the terrestrial radio channel TR and very high frequency VHF.

The characterizing identifier, in FIG. 2B, this is the index number "4", of the transmission configuration $UC_4$, is added to the data packets transmitted according to the transmission configuration $UC_4$ or by means of the transmission channels UCH stored in the transmission configuration $UC_4$, and is transmitted to the flight security system together with the data packets.

On the one hand, the transmission of the identifier may be carried out in that the identifier is transmitted as a separate data packet with the other data packets to be transmitted from the aircraft to the flight security system.

In order to save data volume and traffic when transmitting the characterizing identifier, the characterizing identifier may, however, advantageously also be transmitted piggyback in the flow label of an IPv6 data packet, as in the exemplary embodiment. Thus, no separate data packets have to be transmitted with the characterizing identifier, thereby advantageously saving data volume and data traffic.

An additional set of rules R' which has additional transmission configurations UC' and which is complementary to the set of rules of the aircraft is stored in the ground-based multilink management unit MME' of the flight security system, or in the additional memory 5'. With the aid of the characterizing identifier for each transmission configuration UC of the aircraft, a corresponding respective additional transmission configuration UC' of the stationary transmission and reception device 200 of the flight security system may be ascertained, which enables a return transmission of data packets from the flight security system to the aircraft over the same transmission channel UCH as was used to transmit data packets from the aircraft to the flight security system.

In the depicted exemplary embodiment in FIG. 3, in addition, the characterizing identifier "4" is extracted from the data packets to be transmitted, and the additional transmission configuration $UC'_4$, which is associated with the identifier is selected for the return transmission of data packets to the aircraft.

If, for example, at the instant of changing the transmission configuration UC, no transmission takes place of data packets via which the identifier of the transmission configuration UC can be transmitted as a separate data packet, or "piggyback," from the aircraft to the flight security system, as in the exemplary embodiment, a dummy data packet may optionally be transmitted from the aircraft to the flight security system, for updating which additional transmission configuration UC' is to be used by the flight security system for transmitting data to the aircraft. The characterizing identifier of the current transmission configuration of the aircraft is contained in such a dummy data packet, such that the flight security system is advantageously always informed about which transmission configuration UC the aircraft is currently using, or which additional transmission configuration UC' is to be used for data transmission to the aircraft. Such dummy data packets may, for example, be created by the multilink management unit MME and provided to the onboard multilink unit OME for transmitting to the flight security system.

When measuring the transmission quality of the individual transmission channels UCH, it is then determined in the exemplary embodiment in FIG. 3 that not only the terrestrial radio channel TR, but also the satellite radio channel SR, have good transmission quality H. In this case, the transmission configuration $UC_1$ having the characterizing identifier "1" is selected by the multilink management unit MME of the aircraft. This means that, for example, data packets ATS which relate to remote flight signaling are transmitted over the terrestrial radio channel TR via very high frequency VHF. Data packets AOC which relate to the operative control of the aircraft are transmitted over the satellite radio channel SR, which is characterized by the reference "SAT".

While the aircraft continues its flight, it crosses an ocean and loses radio contact with the flight security system over the terrestrial radio channel TR. This means that the terrestrial radio channel TR is not available U, and only the satellite radio channel SR has good transmission quality H. In this case, the multilink management unit MME of the aircraft selects the transmission configuration $UC_{13}$, which has the characterizing identifier "13". This means that all data packets to be transmitted are now transmitted over the satellite radio channel SR.

During the course of its flight, the aircraft then approaches a continent, wherein a data exchange can be re-established over the terrestrial radio channel TR, but with poor transmission quality L. The connection over the satellite radio channel SR still has good transmission quality H. In this case, the multilink management unit MME of the aircraft selects the transmission configuration $UC_9$ having the characterizing identifier "9". This means that ACARS data packets are transmitted over the terrestrial radio channel TR via very high frequency VHF, and CPDLC data packets are transmitted over the satellite radio channel SR, which is characterized by the reference "SAT". All other data transmissions are carried out via very high frequency, i.e., the terrestrial radio channel TR via very high frequency VHF.

In all described cases, the characterizing identifier can be transmitted "piggyback" in the respective data packets from the aircraft to the flight security system, and the ground-based stationary multilink management unit MME' of the flight security system selects the corresponding additional transmission configuration UC' from the additional set of rules R' for transmitting data packets to the aircraft of the same transmission channel UCH.

However, a method according to the present invention for transmitting data between a vehicle and a traffic security system, or a transmission and reception device 100 according to the present invention, and a stationary transmission and reception device 200 according to the present invention, may not be only used only in aviation, as previously described. Such transmission and reception devices 100, 200 may also be used for transmitting data between any vehicle to which different transmission channels are available for transmitting data to a stationary traffic security system, and the respective traffic security system. A data transmission between a ship and the respective shipping security system is mentioned here by way of example.

The invention claimed is:

1. A method for transmitting data between a vehicle and a traffic security system, which comprises the steps of:
    making available a plurality of possible transmission channels for transmitting the data between the vehicle and the traffic security system;
    specifying in the vehicle data packets for a transmission from the vehicle to the traffic security system;
    measuring a transmission quality of the possible transmission channels;
    selecting a transmission configuration from a plurality of previously specified transmission configurations, from a type of the data to be transmitted and ascertained transmission qualities, wherein the transmission configuration specifies the possible transmission channels for the data packets which are associated with a service;
    selecting an identifier characterizing the transmission configuration to be used for a transmission of the data packets to the traffic security system;
    notifying the traffic security system by transmitting the identifier from the vehicle to the traffic security system by way of one of the following:
        transmitting the identifier in a separate data packet; or
        transmitting the identifier as a piggy-back component of the data packets specified in the vehicle for the transmission; and
    transmitting the data packets specified in the vehicle for the transmission to the traffic security system via a transmission channel prescribed according to the transmission configuration.

2. The method according to claim 1, wherein:
    the data packets are specified for a subsequent data transmission between the traffic security system and the vehicle;
    for each of the transmission configurations in the vehicle, an additional transmission configuration is available, which enables a return transmission over a same transmission channel;
    the identifier is identified from the data packet transmitted by the vehicle, and the additional transmission configuration is selected which is associated with the identifier; and
    the data packets specified are transmitted from the traffic security system to the vehicle corresponding to the additional transmission configuration selected.

3. The method according to claim 2, wherein the additional transmission configuration is available on the ground.

4. The method according to claim 1, wherein the identifier is configured to update an additional transmission configuration to be used by the traffic security system for data transmission to the vehicle.

5. The method according to claim 1, which further comprises transmitting dummy data packets containing the identifier from the vehicle to the traffic security system, for updating the additional transmission configuration to be used by the traffic security system for data transmission to the vehicle, in particular if no data packet has been transmitted from the vehicle to the traffic security system for a given period of time.

6. The method according to claim 1,
    wherein the vehicle is an aircraft or a watercraft;
    wherein the traffic security system is a ground-based flight security system or shipping security system;
    wherein the transmission quality of the possible transmission channels is measured continuously and/or at a plurality of instants;
    wherein the transmission configuration is selected from the plurality of previously specified transmission configurations, from the type of the data to be transmitted and the ascertained transmission qualities, and other specifications according to a specified set of rules; and
    wherein the transmission configuration specifies the particular transmission channels for the data packets which are associated with the service in dependence on a content of a respective one of the data packets.

7. A transmission and reception device for use in a vehicle, comprising:
    a plurality of transmission units for transmitting data over different transmission channels between the vehicle and a traffic security system;
    at least one data processing system for creating data packets for transmission to the traffic security system, and for processing the data packets transmitted to the vehicle;
    an onboard multilink unit coupled to the transmission channels and connected to said at least one data processing system, said onboard multilink unit being configured to route the data packets to be transmitted to the transmission channels, and/or to obtain received said data packets from the transmission channels;
    a multilink management unit having a memory and being connected to said onboard multilink unit and being coupled to the transmission channels;
    a specified set of rules stored in said memory of said multilink management unit, and containing a plurality of different transmission configurations for routing the data packets to be transmitted; and
    said multilink management unit being configured:
    to measure a transmission quality which is available for a data transmission in the transmission channels;
    to select a transmission configuration from a type of the data to be transmitted and ascertained transmission qualities, and additional specifications according to the specified of rules;
    to notify the traffic security system by transmitting an identifier to the traffic security system:
        as a separate data packet from the vehicle to the traffic security system; or as a piggy-back component of the data packets specified in the vehicle for the transmission; and to specify the transmission channels and to add the identifier to the data packets characterizing the transmission configuration, corresponding to a respectively selected transmission configuration for individual said data packets associated with a service; and to actuate said onboard multilink unit for transmitting the identifier and the data packets to the traffic security system over the transmission channels specified corresponding to the transmission configuration.

8. The transmission and reception device according to claim 7, wherein said multilink management unit is configured to create the dummy data packets containing the identifier and to actuate said onboard multilink unit, in order to transmit the dummy data packets, for updating an additional transmission configuration to be used for data transmission to the vehicle.

9. The transmission and reception device according to claim 7, wherein:
the vehicle is an aircraft or a watercraft;
the traffic security system is a ground-based flight security system or shipping security system; and
the transmission quality is measured continuously and/at a plurality of instants.

10. The transmission and reception device according to claim 7, wherein said multilink management unit is configured to create the dummy data packets containing the identifier and to actuate said onboard multilink unit, in order to transmit the dummy data packets, for updating an additional transmission configuration to be used for data transmission to the vehicle, if no more data packets have been transmitted from the vehicle over a given period of time.

11. A data transmission system for transmitting data between a vehicle and a traffic security system, comprising:
a transmission and reception device according to claim 7;
a stationary transmission and reception device for use in a traffic security system, containing:
a plurality of transmission units for transmitting the data in the transmission channels between the traffic security system and the vehicle;

at least one data processing system for creating additional data packets for transmission to the vehicle, and for processing the data packets transmitted to the traffic security system;

a ground multilink unit coupled to the transmission channels and connected to said at least one data processing system for creating the additional data packets, and configured to route the additional data packets to be transmitted over the transmission channels, and/or to obtain the data packets received over the transmission channels;

a stationary multilink management unit connected to said ground multilink unit, and having an additional memory;

an additional specified set of rules containing a plurality of additional transmission configurations for routing the additional data packets to be transmitted stored in said additional memory, wherein a respective additional transmission configuration is available in said additional memory for each of the transmission configurations of said transmission and reception device, said additional transmission configuration enabling a return transmission over a same transmission channel; and said stationary multilink management unit being configured:

to identify the identifier from the data packet transmitted to the traffic security system, and to select the additional transmission configuration which is associated with the identifier;

to specify the transmission channels corresponding to the respectively selected additional transmission configuration; and to actuate said ground multilink unit for transmitting the additional data packets to the vehicle over a specified transmission channels corresponding to the additional transmission configuration.

* * * * *